March 5, 1935.  H. WILLSHAW ET AL  1,993,393
APPARATUS FOR MEASURING AND CUTTING
Filed Oct. 24, 1934  4 Sheets-Sheet 1
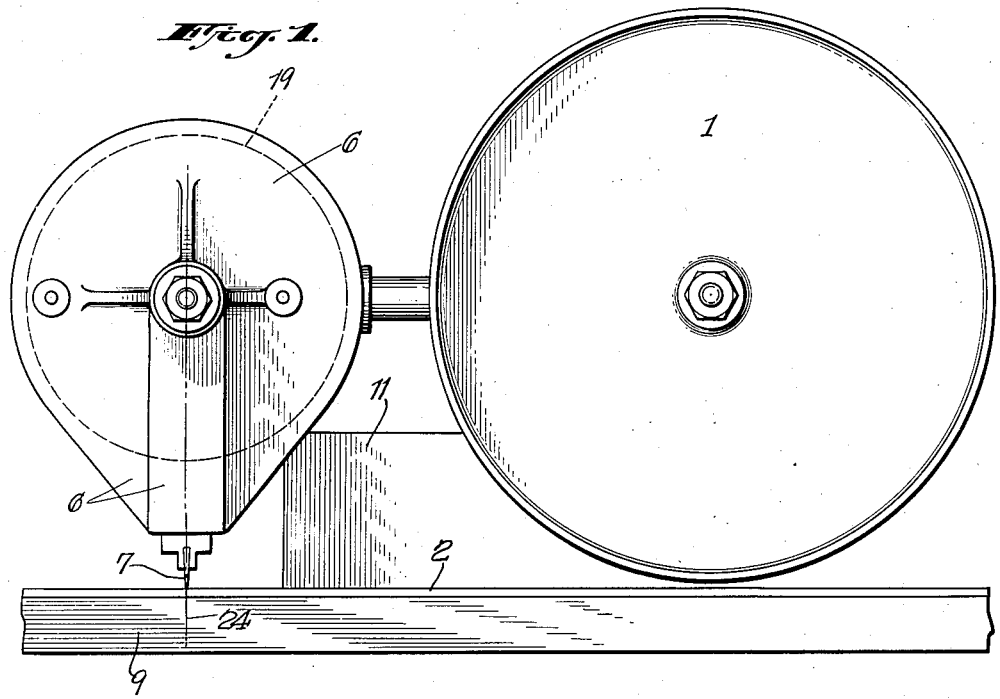
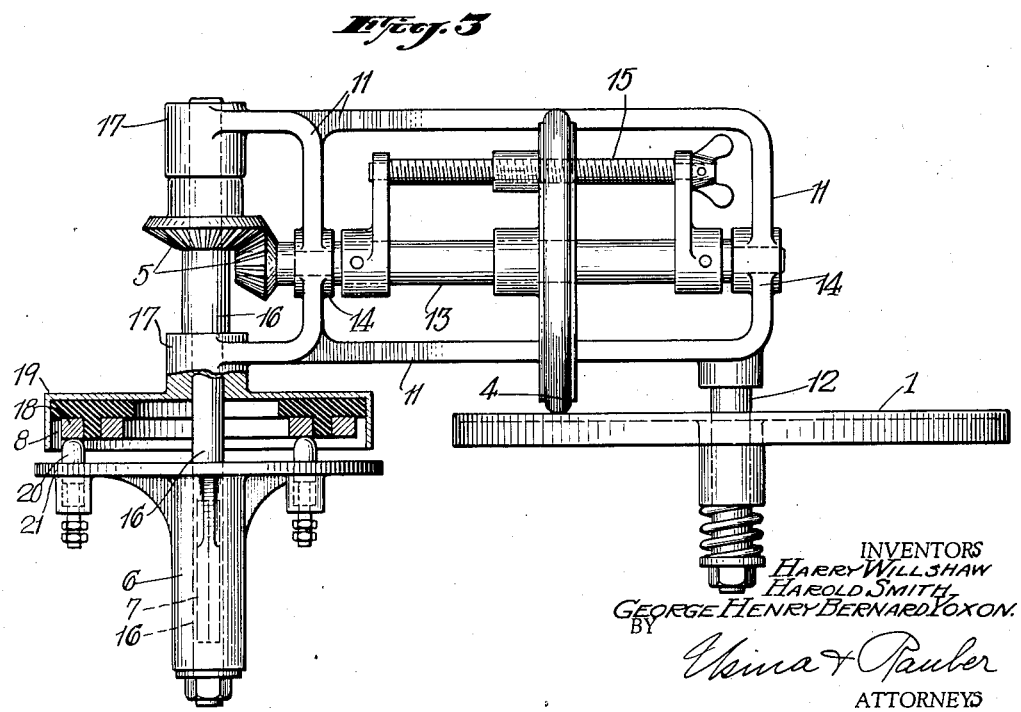
INVENTORS
HARRY WILLSHAW
HAROLD SMITH,
GEORGE HENRY BERNARD YOXON.
BY
ATTORNEYS

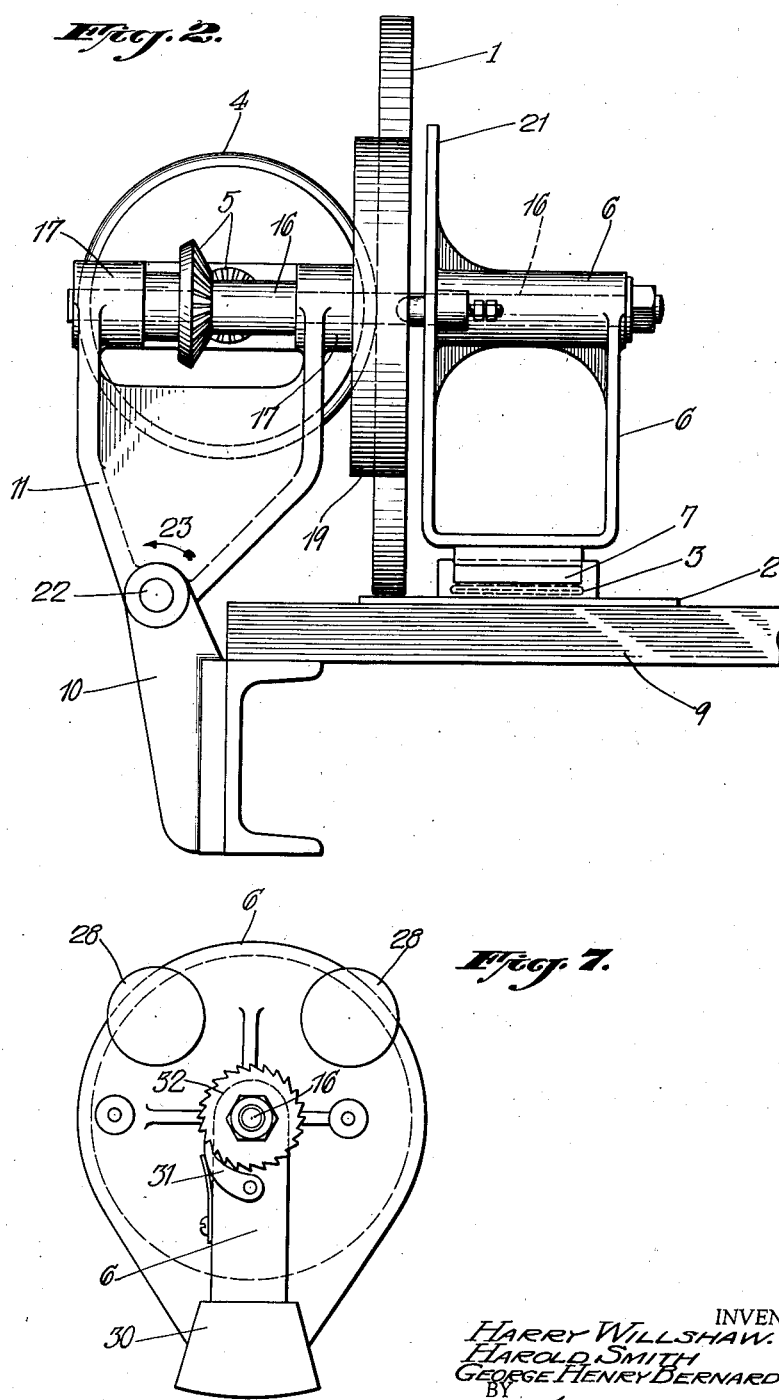

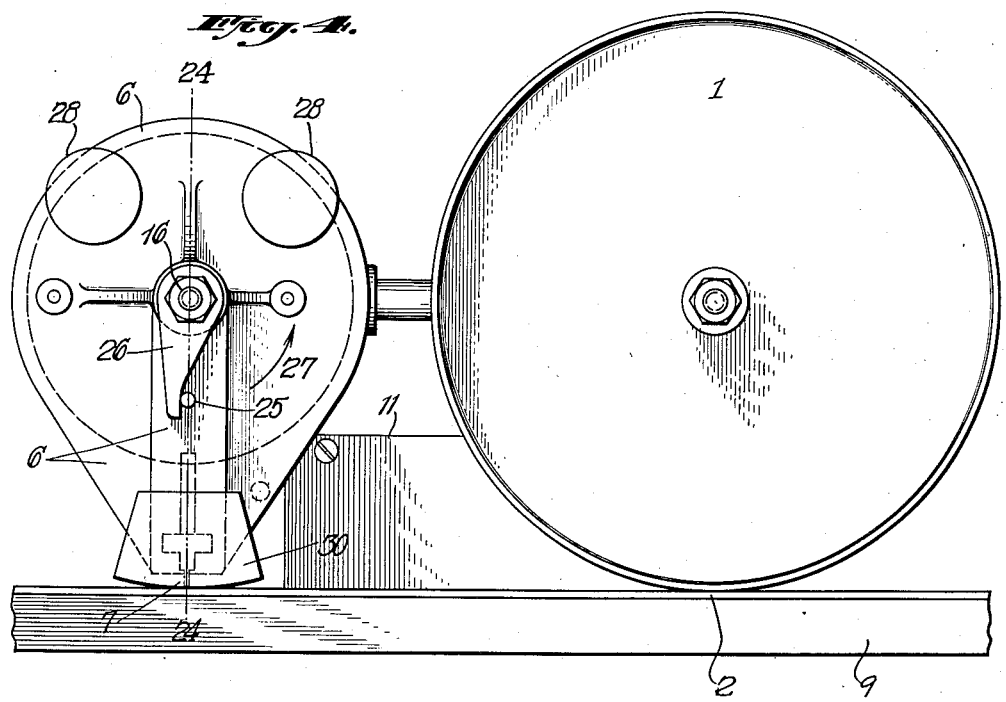
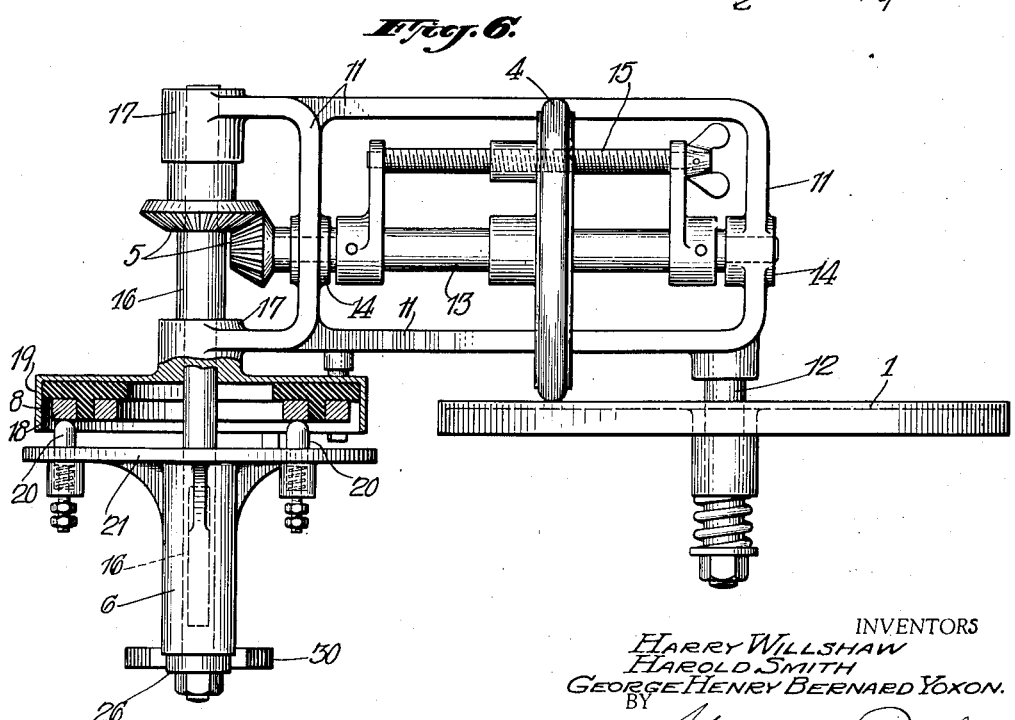

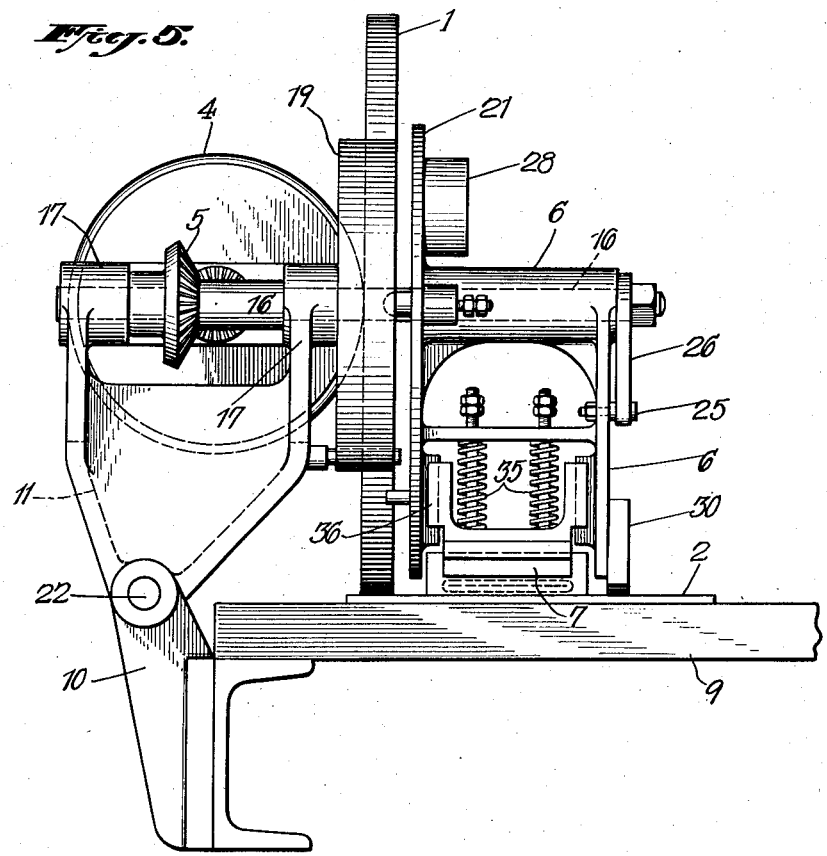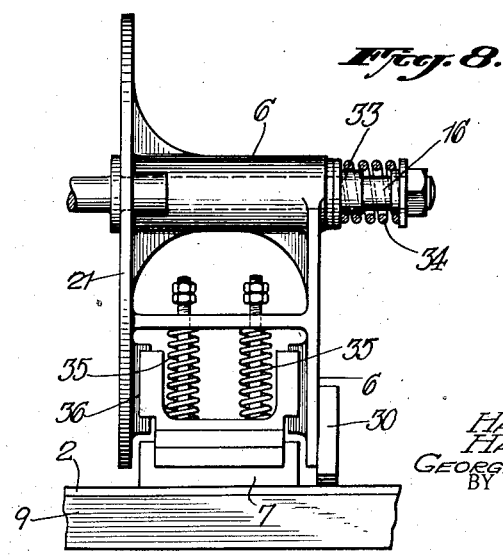

Patented Mar. 5, 1935

1,993,393

UNITED STATES PATENT OFFICE 1,993,393

APPARATUS FOR MEASURING AND CUTTING

Harry Willshaw, Wylde Green, Harold Smith, Sutton Coldfield, and George Henry Bernard Yoxon, Handsworth, Birmingham, England, assignors to Dunlop Tire and Rubber Corporation, Buffalo, N. Y., a corporation of New York Application October 24, 1934, Serial No. 749,750
In Great Britain September 21, 1933

6 Claims. (Cl. 164—68)

This invention relates to means for measuring and cutting and is applicable particularly in connection with rubber or the like or material treated with or containing rubber or the like. It relates especially to the manufacture of pneumatic tire tubes produced from extruded, or otherwise formed, long strips or lengths, the invention being applied in this instance to the purpose of dividing the main length into accurately measured shorter lengths which are subsequently joined into the annular formation of the tire tube.

The invention is not, however, confined to this application as it may also be applied for example in connection with the manufacture of tire treads, flaps or protector bands for tires and in various other instances where it is desired to produce a number of accurately measured lengths from a comparatively long length.

According to this invention we provide measuring and cutting apparatus wherein the measuring means drives the cutting means, hereinafter called the cutter, at a given speed, wherein measuring is effected by the relationship between said speed and the speed of travel of the material, and wherein the two said speeds may be different.

In the preferred form said apparatus comprises a carrier for the cutter adapted to be rotated at said given speed by the measuring means which latter comprises a wheel driven by contact with the material or a conveyor therefor, said wheel driving said carrier via mechanical gearing substantially as hereinafter described.

In the preferred form of the invention, wherein the respective speeds of the cutter and the material are different, provision is preferably made correctly to correlate the two said speeds at and about the time at which cutting takes place, and this correlation may be effected in various ways as will hereinafter become apparent.

Various other provisions and features of our invention, such for example as the fact that the cutter is preferably a heated member adapted to effect severance wholly or partially by reason of its heat, will become apparent as the description proceeds.

In order that our invention may be readily understood and easily carried into effect, we will now describe various forms of it as embodied in connection with the manufacture of pneumatic tire tubes by the extrusion process, with reference to the accompanying drawings, in which—

Figs. 1, 2 and 3 are, respectively, side, end and plan views of one embodiment of the said invention.

Figs. 4, 5 and 6 are, respectively, side, end and plan views of another embodiment thereof.

Figs. 7 and 8 illustrate another two alternatives, Fig. 7 being a part side view and Fig. 8 a part end view.

The tube length passes continuously from an extruder onto a continuously moving conveyor—between the two, the said lengths may pass through a cooling system of any convenient kind.

Disposed in a suitable position on said conveyor is the measuring and cutting means according to this inventon and in the preferred scheme the same comprises a measuring wheel 1 driven by frictional contact with the surface of the conveyor 2, or with that of the tube 3. Bearing against the face of this measuring wheel is a friction disc 4 which drives, via suitable gearing 5, a rotary member 6, hereinafter called the blade carrier, which latter carries the cutter. Said cutter preferably comprises an electrically heated blade 7 and, because the same rotates, suitble "brush" or contactor gear 8 is incorporated into the design to supply said blade with current.

The constructional details of the embodiment of our invention illustrated, by way of example only, in the drawings are as follows—attention is drawn to the fact that the preferred form of the invention as herein illustrated provides a measuring and cutting device in which the measuring means and the cutting means, although separate from each other, are incorporated into a compact unit of apparatus.

Fixed to a table or the like 9 there is a bracket 10 on which is pivoted the main frame 11 of the apparatus. The measuring wheel 1 is freely rotatable on a spindle 12 fixed in said frame. The disc 4 is keyed on a shaft 13 journalled in bearings 14 in the frame 11. Said disc 4 is slidable on said shaft by means of screw mechanism 15 for the purpose of adjustment for different lengths. The shaft 13 rotates via the gearing 5 a further shaft 16 journalled in bearings 17 in the frame 11, said shaft 16 carrying the blade carrier 6. The "brush" gear 8 comprises a contact track 18 in a housing 19 which is part of the frame 11, and spring loaded contacts 20 carried by a flange 21 which is part of the blade carrier 6.

In operation the measuring wheel 1, driven frictionally by the conveyor 2, rotates the friction disc 4 at a speed predetermined by the position of said disc on said wheel. The disc rotates the blade carrier 6, via the gearing described, at the required speed and thus the blade 7 rotates into contact with the extruded tubing 3 at set intervals corresponding to the required length, measuring as will be apparent, being effected by the relationship between the rotary speed of the blade and the speed of travel of the tube, by which latter expression we mean, throughout the specification and claims, the speed of displacement of the material to be cut relative to the point at which it is cut.

If these speeds, i. e., the speed of the blade and the tube, respectively, are not the same—in practice they rarely or never are the same—the tube will either stretch or pucker up, according to whether the blade is moving faster or slower than said tube. To obviate this effect we make provision correctly to correlate the two said speeds at and about the time at which cutting takes place. This may be done in various ways, for example:

In Figs. 1, 2 and 3 the arrangement is such that, when the blade 7 rotates into contact with the tube 3 and/or the conveyor 2, it tilts the whole frame 11 about the pivot 22 in the direction of the arrow 23, Fig. 2, the measuring wheel 1 being thereby separated from the conveyor so that rotational drive to the blade, via said wheel, is stopped. As the blade, however, is in contact with the conveyor, the latter pulls it along for a short interval, during which blade and conveyor are obviously moving at the same speed. When the blade has been so pulled over dead center 24, the frame 11 lowers again under gravity and the measuring wheel again engages the conveyor so as to drive the blade carrier in another revolution.

In other and preferred arrangements we utilize some form of "free wheel" or analogous means, for example, as follows:

In Figs. 4, 5 and 6 the blade carrier 6 is rotatably mounted on the spindle 16 and driving connection is made between them via the peg and lever mechanism illustrated, said mechanism comprising a peg 25 fixed to the blade carrier 6 and a lever 26 fixed to the spindle 16.

In operation, the lever 26 rotating with the spindle 16 engages the peg 25 so as to carry the blade carrier round in the direction of arrow 27 in Fig. 4. Balance weights 28 or frictional provision between the blade carrier and the spindle 16 prevent said carrier swinging freely round after the blade has passed dead center 24.

When the blade approaches the tube, a rubber pad 30 fixed on the blade carrier moves into engagement with the conveyor 2, and, the latter moving faster than the rotational speed which the blade carrier gets from the measuring wheel, said conveyor then, because of its contact with the pad 30, drives the blade carrier and so rotates the blade in cutting coaction with the tube—at a speed which is, of course, the same as that at which said tube is moving, the speed of the blade carrier being temporarily dictated by the speed of the conveyor.

Cutting being over, the conveyor carries the pad 30 past dead center 24. Said pad thereupon ceases to transmit drive to the blade carrier. The lever 26, driven continuously by the spindle 16, again overtakes the peg 25, the latter having moved away from said lever during the time the blade carrier was driven by the pad 30. Coaction between said peg and lever again puts the blade carrier into driving coaction with the measuring wheel, and so said blade carrier is again taken round in another revolution.

In another arrangement, illustrated in Fig. 7, this peg and lever mechanism is replaced by ratchet and pawl mechanism, of which the pawl 31 is carried by the blade carrier 6 while the ratchet 32 is carried by the spindle 16.

In still another arrangement illustrated in Fig. 8, driving connection between the spindle 16 and the blade carrier 6 is maintained by means of friction mechanism 33 spring loaded as shown at 34. The friction thus acting between the spindle 16 and the blade carrier 6 is sufficient to cause said spindle to carry the blade carrier round until the rubber pad 30 engages the conveyor. Then the pull of the conveyor overcomes said friction for a short interval, the friction device 33 slipping to allow the blade carrier to rotate at the same speed as the conveyor, i. e., faster than the spindle 16 is rotating under the influence of the measuring wheel.

In certain embodiments the blade is spring loaded in its carrier as shown at 35, said blade then sliding in guides 36 formed on said carrier as shown in the drawings. In particular, this provision is made in the arrangements shown in Figs. 4 to 8 inclusive, wherein said springs, together with the rubber pad 30, allow the blade to make contact with tube and conveyor, while the measuring wheel also maintains contact with said conveyor.

It is not to be construed that we are limited to the foregoing or any one particular form of the invention as the same may be embodied in a variety of different forms.

What we claim is—

1. Apparatus for cutting and measuring material in movement which comprises a contact wheel movable with the movement of said material, a cutter mechanism rotatable to bring a cutter into cutting engagement with said material, means to drive said cutter mechanism at a selected speed ratio relative to said contact wheel, and means to drive said cutter mechanism at the speed of said material while in contact therewith.

2. The apparatus of claim 1 comprising a ratchet device to permit said cutter mechanism to overtravel its speed ratio to said contact wheel.

3. The apparatus of claim 1 comprising means to move said contact wheel out of contacting position when said cutter is in contact with said material.

4. The apparatus of claim 1 comprising a free wheeling relation between said cutting mechanism and said contact wheel when said cutting mechanism is in contact with said material to be cut.

5. The apparatus of claim 1 which comprises a mechanism between said contact wheel and said cutting mechanism permitting said cutter to move synchronously with said material in advance of its normal speed ratio while in contact with said material, and means for restoring the speed ratio between said cutting mechanism and contact wheel.

6. Apparatus for measuring and cutting material which comprises a frame having a pivoted mounting, a contact measuring wheel on said frame rotatable with material to be measured and cut, a cutting mechanism driven at a selected speed ratio to said contact measuring wheel, said cutting mechanism comprising a cutter to engage and move with material to be cut and to tilt said frame upwardly during said contact to lift said measuring wheel out of contact position.

HARRY WILLSHAW.
HAROLD SMITH.
GEORGE HENRY BERNARD YOXON.